United States Patent [19]

Ellison et al.

[11] Patent Number: 4,931,324
[45] Date of Patent: Jun. 5, 1990

[54] DECORATIVE SHEET MATERIAL SIMULATING THE APPEARANCE OF A BASE COAT/CLEAR COAT PAINT FINISH

[75] Inventors: Thomas M. Ellison; Robert A. Winton, both of Charlotte, N.C.

[73] Assignee: Rexham Corporation, New York, N.Y.

[21] Appl. No.: 241,856

[22] Filed: Sep. 8, 1988

Related U.S. Application Data

[63] Continuation-in-part of Ser. No. 924,299, Oct. 28, 1986, Pat. No. 4,810,540.

[51] Int. Cl.⁵ .............................. B60R 13/04
[52] U.S. Cl. ........................ 428/31; 428/40; 428/46; 428/208; 428/908.8
[58] Field of Search ............ 428/31, 40, 46, 208, 428/908.8

[56] References Cited

U.S. PATENT DOCUMENTS

| | | | |
|---|---|---|---|
| 2,880,542 | 4/1959 | Butterweich | 428/208 |
| 3,524,906 | 8/1970 | Schmitt et al. | 428/142 X |
| 3,549,405 | 12/1970 | Schrenk et al. | 428/142 |
| 3,697,070 | 10/1972 | McAdow | 524/441 X |
| 3,806,397 | 4/1974 | Kukoff | 428/40 |
| 3,988,494 | 10/1976 | McAdow | 428/328 |
| 4,126,727 | 11/1978 | Kaminski | 428/172 |
| 4,215,170 | 7/1980 | Oliva | 428/325 |
| 4,248,917 | 2/1981 | Hornibrook et al. | 428/40 |
| 4,307,149 | 12/1981 | Scott et al. | 428/323 |
| 4,311,757 | 1/1982 | Raghava et al. | 428/323 |
| 4,359,491 | 11/1982 | Lai-Chun | 428/208 X |
| 4,409,280 | 10/1983 | Wiley et al. | 428/208 X |
| 4,501,852 | 2/1985 | Markusch et al. | 524/591 |
| 4,533,592 | 8/1985 | Bingham | 428/213 |
| 4,578,426 | 3/1986 | Lenz et al. | 525/131 |
| 4,584,231 | 4/1986 | Knoop | 428/500 X |
| 4,664,859 | 5/1987 | Knoop | 428/500 X |
| 4,678,690 | 7/1987 | Palmer et al. | 428/31 |
| 4,769,265 | 9/1988 | Coburn, Jr. | 428/40 |
| 4,810,540 | 3/1989 | Ellison et al. | 428/31 |

FOREIGN PATENT DOCUMENTS

2084513  4/1982  United Kingdom ........... 428/31

OTHER PUBLICATIONS

Chemical Week, Jul. 4, 1984, p. 30, Automotive Coatings: Helping Detroit Woo Consumers.
Polymers Paint Colour Journal, Oct. 29, 1980, pp. 796 and 798, The Orientation of Aluminum Pigments in Automotive Finishes, Contributed by Toyo Aluminum K. K.

*Primary Examiner*—Henry F. Epstein
*Attorney, Agent, or Firm*—Bell, Seltzer, Park & Gibson

[57] ABSTRACT

A flexible decorative sheet material for use in surfacing automobile body panels and the like is disclosed. The sheet material is characterized by having the appearance of a glossy base coat/clear coat automotive paint finish. The material comprises a substantially transparent outer layer, and a pigmented coating on the undersurface of the outer layer which is visible therethrough. The pigmented coating preferably has reflective flakes uniformly distributed therein to impart to the sheet material the appearance of a base coat/clear coat paint finish. Also disclosed are shaped articles which have such sheet materials adhered to one side thereof, and a method for making such sheet materials.

19 Claims, 1 Drawing Sheet

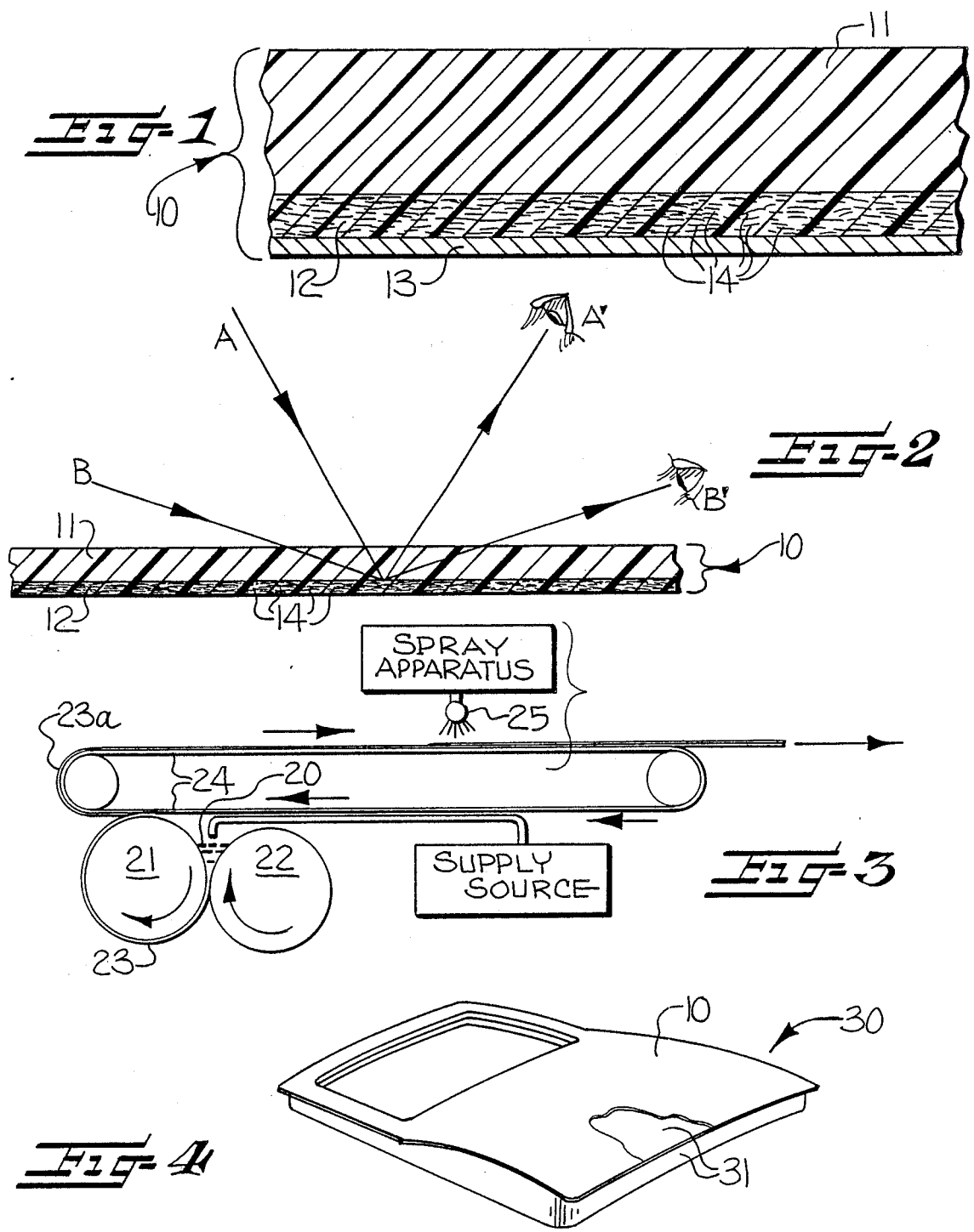

DECORATIVE SHEET MATERIAL SIMULATING THE APPEARANCE OF A BASE COAT/CLEAR COAT PAINT FINISH

CROSS REFERENCE TO RELATED APPLICATIONS

This application is a continuation-in-part of application Ser. No. 924,299 filed Oct. 28, 1986, now U.S. Pat. No. 4,810,540.

FILED OF THE INVENTION

The present invention relates to sheet materials generally, and particularly relates to a sheet material which can be used to provide a decorative surface on automobile body panels and the like.

BACKGROUND OF THE INVENTION

Among the most important selling features of automobiles is the quality of their painted finish. For this reason, nearly half of automobile assembly costs are devoted to coating operations. See generally, "Automobile Coatings: Helping Detroit Woo Consumers", Chemical Week, 30 (July 4, 1984). As aerodynamic body styles become more prevalent, and sharp edges and other decorative detail features continue to be removed from automobile bodies, paint finish will exert an increasingly important influence on the overall decorative appearance of automobiles.

For these reasons, about 70% of the cars sold in the U.S. market are coated with a metallic finish. The difference in brightness and hue obtained when such a finish is observed emphasizes the styling lines of the car, highlighting small curvatures. This effect is known as "flop." The new base coat/clear coat paint finishes, which provide "wet look" paint finishes with or without a metallic appearance, can be used to produce a very high quality metallic finish with excellent flop, and are emerging as the finish of choice in the automobile industry. See, e.g., J. Schrantz, "Painting the Corvette", Industrial Finishing, 18 (March, 1984). In addition, because the clear coat protects the base coat, greater quantities of pigments can be incorporated into the base coat without the weatherability of the finish being unacceptably decreased. Base coat/clear coat finishes, however, and particularly metallic finishes, pose significant (and expensive) pollution problems arising from the evaporation of harmful paint solvents. Moreover, they are difficult to provide on plastic automobile body panels, which are becoming a popular mode of construction in the industry. Finally, base coat/clear coat paint finishes in general involve multiple painting steps which are very expensive to perform when high quality standards are maintained.

Accordingly, objects of the present invention are to provide a way to produce automobiles and the like with high quality decorative finishes like a base coat/clear coat finish, which can be used on molded plastic body panels, which does not require expensive painting steps, and which serves to reduce the emission control problems previously faced by manufacturers who wished to produce automobiles with base coat/clear coat finishes.

SUMMARY OF THE INVENTION

The foregoing objects are achieved by a flexible decorative sheet material, disclosed herein, for use in surfacing automobile body panels and the like. This sheet material is characterized by having the appearance of a base coat/clear coat paint finish when viewing the outer surface thereof. The sheet material comprises a glossy, substantially transparent outer layer and a pigmented coating on the undersurface of the outer layer and visible therethrough.

The glossy "wet look" is achieved by a combination of layered coatings, with the outer or top layer being of good optical clarity and exceptionally good surface smoothness. The outer layer must be of high gloss and should possess a high distinctness-of-image value, preferably of 65 percent or higher, and most desirably of 75 percent or higher. The outer layer should also have low surface haze, preferably a 2 degree haze value of 1 percent or less. Additionally, the outer layer must be weatherable, so as to withstand exposure to sunlight and temperature extremes without hazing, color change, cracking, crazing or embrittlement.

These properties are achieved in accordance with the present invention by casting the clear outer layer on a smooth high gloss carrier, and thereafter coating the pigmented coating layer onto the outer layer by suitable coating application methods such as spraying or roll coating. The advantage of spraying is the resulting similarity in appearance with spray-applied paint, although this application method is not essential.

The outer layer is formed from a substantially clear weatherable polymer, preferably a polymer selected from the group consisting of fluoropolymers, acrylate polymers, urethane polymers, vinyl polymers and blends thereof. The transparent outer layer is preferably of a thickness greater than that of the pigmented coating layer. The precise thickness of the pigmented coating is, however, selected to impart the specific predetermined appearance to the sheet material which is desired.

The pigmented coating optionally has reflective flakes uniformly distributed therein to impart to the sheet material the appearance of a metallic base coat/clear coat paint finish. The reflective flakes in the pigmented coating are preferably oriented generally parallel to the outer layer.

Sheet materials of the present invention include dual-color sheet materials which comprise a substantially transparent outer layer and a pigmented coating on the undersurface thereof, wherein the pigmented coating comprises a first pigmented coating on certain portions of the undersurface of the outer layer and visible therethrough, and a second pigmented coating of a different color on certain other portions of the undersurface of the outer layer, which second pigmented coating is also visible therethrough.

Also disclosed herein are shaped articles having a contoured decorative outer surface suitable for use as automobile body panels and the like. The articles comprise a supporting substrate and a decorative sheet material adhered to one side of the substrate, conforming to the contoured surface to impart to the outer surface the appearance of a base coat/clear coat paint finish. The decorative sheet material is as described above. The supporting substrate, which may be formed of a number of materials, is preferably a rigid metal substrate or a molded polymer substrate.

The present invention allows paint and finish handling steps involving solvents to be performed in a central plant, and the "finish" to be shipped, in sheet form, to a number of automobile assembly plants and the like. This allows solvent emission control problems attendant to such procedures to be handled in a centralized location, reduces the emission control expenses at numerous assembly plants, and serves to reduce the cost and complexity of solvent emissions control in general.

BRIEF DESCRIPTION OF THE DRAWINGS

FIG. 1 is a cross-sectional view of a decorative sheet material of the present invention.

FIG. 2 is a schematic diagram which illustrates the properties of sheet materials of the present invention.

FIG. 3 is a schematic illustration of a method for making decorative sheet materials of the present invention.

FIG. 4 is an article of the present invention with a portion broken away to show the decorative sheet material on the outer surface thereof.

DETAILED DESCRIPTION OF THE INVENTION

A decorative sheet material 10 of the present invention is illustrated in FIG. 1. The sheet material comprises a substantially clear outer film 11, a pigmented coating 12 on the undersurface of the film 11, and a bonding layer 13 carried by the inner surface of the pigmented coating.

Films 11 for practicing the present invention should be selected so they are transparent, thermoformable and weatherable. The film 11 is about 0.5 to about 300 thousandths of an inch thick, and is preferably from about one to about two thousandths of an inch thick. Such films are preferably substantially molecularly unoriented cast films, as opposed to films which have been oriented or biaxially oriented, and are preferably substantially colorless. The cast film is formed before the pigmented coating is applied thereto. Such films are prepared by a number of known liquid casting methods, such as by spreading a solvent solution having a polymer dissolved therein onto a carrier with a casting die, doctor bar, or reverse roll coater, then evaporating the solvent, and then stripping the polymer film from the carrier. The reverse roll coating method is the preferred method of making liquid cast films for the present invention. Other liquid casting methods are also known and useful for practicing the present invention. In appropriate cases, a plastisol, organosol, or dispersion of the polymer can be cast onto the carrier instead of a solvent solution. For example, polytetrafluoroethylene, which is virtually insoluble, can be liquified and cast as a dispersion. Such liquid cast film processes, and some current uses of cast films, are discussed in Plastics Engineering, at pages 29–33 (May, 1983). Thus, for purposes of the present invention, "substantially molecularly unoriented cast films" are liquid cast films, and not melt cast films or films formed by extrusion.

Polymers suitable for forming such cast films are preferably weatherable polymers selected to provide a film which will not significantly fade, peel, crack, or chalk when exposed to the environment, for the intended life of the product for which the decorative sheet material is made. A number of known testing procedures, in which objects are exposed to either the natural environment over an extended time or a harsh artificial environment for a short time, are used to determine the weatherability of polymers. Such weatherable polymers include fluoropolymers, acrylate polymers, urethane polymers, vinyl polymers, and blends thereof. Acrylate polymers useful for practicing the present invention are obtained from a variety of acrylic monomers, such as acrylic and methacrylic acids, and their amides, esters, salts, and corresponding nitriles. Particularly suitable monomers for such polymers are methyl methacrylate, ethyl acrylate, and acrylonitrile. The polymers may each be used in the form of homopolymers, or with various other monomers which can be copolymerized therewith. Additional illustrative examples of acrylate polymers useful for the present invention are polyacrylates and polymethacrylates which are homopolymers and copolymers of acrylic acid ester and methacrylic acid ester, such as, for example, polyacrylic acid isobutyl ester, polymethacrylic acid methyl ester, polymethacrylic acid ethylhexyl ester, polyacrylic acid ethyl ester; copolymers of various acrylic acid esters and/or methacrylic acid esters, such as, for example, methacrylic acid methyl ester/acrylic acid cyclohexyl ester copolymers; and copolymers of acrylic acid esters and/or methacrylic acid esters with styrene and/or alphamethylstyrene, as well as the graft polymers and copolymers and polymer mixtures composed of acrylic esters, methacrylic acid esters, styrene and butadiene. A group of transparent, weatherable blends of acrylate polymers and polyvinylidene fluoride polymers useful for practicing the present invention are disclosed in U.S. Pat. No. 3,524,906. The disclosures of this patent, and all other patent references cited herein, are specifically intended to be incorporated herein by reference.

Fluoropolymers useful for practicing the present invention include polymers and copolymers formed from trifluoroethylene, tetrafluoroethylene, hexafluoropropylene, monochlorotrifluoroethylene and dichlorodifluoroethylene. Copolymers of these monomers formed from fluoroolefins such as vinylidene fluoride are also useful. Further illustrative examples of fluoropolymers useful for practicing the present invention include polyvinyl fluoride and polyvinylidene fluoride. The fluoropolymer may be a fluorinated ethylene/propylene copolymer (the easily fabricated "FEP" resins), or a copolymer of ethylene/chlorotrifluoroethylene such as "HALAR." Vinylidene fluoride/hexafluoropropene and vinylidene fluoride/perfluoro (alkyl vinyl ether) dipolymers and terpolymers with tetrafluoroethylene are additional illustrative fluoropolymers useful for practicing the present invention. A preferred weatherable polymer for use in the present invention is an alloy of an acrylic polymer and polyvinylidene fluoride, such as "FLUOREX" (a trademark of Rexham Corporation).

Urethane polymers useful for practicing the present invention are prepared by reacting a polyisocyanate with a compound containing at least two active hydrogen atoms, such as a polyol, a polyamine, or a polyisocyanate. Polyurethane resins for use in the present invention should be selected from resins in which the reactants have been chosen to provide weatherable, thermoformable polymers. Numerous suitable polyurethane resins useful for practicing the present invention are available. Generally, aromatic polyisocyanates tend to yellow, and aliphatic polyisocyanates are more preferred. Particularly noteworthy recent developments in this area are disclosed in U.S. Pat. No. 4,578,426 (disclosing resins which give coatings resistant to gasoline and having high flexibility, scratch resistance and weather resistance) and U.S. Pat. No. 4,501,852 (disclosing chemical resistant, abrasion resistant, elastic and durable polyurethanes).

In addition, films formed of vinyl polymers, such as polyvinylchloride films and films formed from copolymers thereof, may also be used to practice the present invention, though such films are generally not as weatherable as films formed from the previously discussed polymers.

The pigmented coating 12 is preferably formed of the same polymer as the outer film 11, or may optionally be formed of a different polymer which will bond to the outer film 11 during the manufacture of the decorative sheet material, as explained below. Pigments are dispersed in the polymer at a suitable concentration to form a substantially opaque coating of the desired color. The specific pigments are selected as desired depending upon the desired color. When the decorative sheet material 10 of the invention is used in automobile body applications, the pigments are selected so that the coating will match the automotive paint standard, and the pigments employed may include conventional nonmetallic pigments as well as metallic pigments. In the embodiment illustrated in FIG. 1 the pigmented coating 12 is a metallic finish, and to this end, the coating has reflective flakes 14 uniformly distributed therein. The reflective flakes 14 may, for example, comprise aluminum flakes or mica flakes. Mica flakes used in the present invention may be untreated, or tinted or otherwise surface treated, as known in the art. The reflective flakes 14 are oriented generally parallel to the outer film 11, with the flakes preferably being oriented so the mean angle of inclination of the flakes to the outer film 11 is less than about 6.5 degrees. The precise limits of the angle of inclination depends on a number of conditions, including the particular type of reflective flake used, the composition of the pigmented coating 12, and the composition of the outer preformed film 11.

The flakes contribute to the "flop" effect described previously. Flop is due to the orientation of the reflective flakes generally parallel to the surface of the finish. As illustrated in FIG. 2, the observer at A' sees the light A reflected by the flakes. A similar situation exists for the observer at B' with light B. Because of the phenomenon of flop, light intensity is lower at B' than A'; i.e., the finish appears darker at B' than A'.

The bonding layer 13 carried by the inner surface of the pigmented coating 12 may comprise a coating or preferably a film laminated to the pigmented coating. Bonding of the pigmented coating 12 to a film bonding layer can be achieved in accordance with known laminating procedures, and with known adhesives. The bonding layer 13 is selected to bond to the substrate for which the decorative sheet material is intended. For example, a decorative sheet material having a fusible olefin bonding layer can be placed in a mold during injection of an olefin resin. Another approach is to bond a PVC film to a fluoropolymer pigment layer with an acrylic adhesive and, in turn, bond the PVC film to an olefin film with a polyester isocyanate adhesive. The pigmented coating 12 may also be laminated to an olefin film with a permanent type acrylic pressure-sensitive adhesive. Still another approach is to coat the pigmented layer 12 with a soluble olefin resin which adheres thereto and bonds to the injected resin without having or requiring an olefin film layer. Such a resin is chlorinated polyolefin 343-1 from Eastman Kodak. This resin may be used in conjunction with an acrylic primer or ingredient to bond to desired fluorocarbon films. Corona treatment of the olefin surface to be bonded to the cast film may optionally be used to achieve an optimum bond. Bonding may also be improved by surface treating the cast film, as by corona treatment.

The preferred method for making the decorative sheet material 10 of the present invention is by reverse-roll coating, as illustrated in FIG. 3. Reverse-roll coating involves providing a puddle 20 of polymer solution between an applicator roll 21 and a metering roll 22. The rolls (21,22), which rotate in the same direction, are spaced apart a predetermined distance to meter a film 23a of the solution onto the applicator roll. The film on the applicator roll is then applied to a suitable smooth surfaced, high gloss carrier 24. A preferred carrier material for use in the invention is a polyethylene terephthalate (PET) film. PET films useful as a carrier for casting are manufactured in a number of grades depending on end use requirements. Most grades contain particulate material such as clay to slightly roughen the surface for improved slip. While this roughening improves film winding and handling, it increases surface haze and reduces distinctness-of-image (DOI) of films cast on such surfaces. For low haze and high DOI, the preferred PET film for use in the present invention has no slip additive. Such films are commercially available with one side treatment or knurled edges to facilitate winding. Table 1 below illustrates the effect of surface roughness on haze and DOI of a nonmetallic Fluorex TM lab-made black base coat/clear coat liquid cast film.

TABLE 1

| Film Grade | Ra[1] ($\mu$m) | DOI[2] (%) | 2° Haze[2] (%) |
| --- | --- | --- | --- |
| 4300 | 0.006 | 70 | 0.2 |
| 3000 | 0.010 | 68 | 0.4 |
| 2000 | 0.028 | 34 | 1.7 |

[1]Ra - Average roughness was measured on the Surtronic 3P surface roughness measurement instrument. Ra is affected by the length of the sample surface measured and the cut-off wavelength of the measurement. Ra values in this test were taken at a sample length of 4.8 mm and a cut-off wavelength of 0.25 mm.
[2]DOI - distinctness-of-image measurements and 2° Haze measurements were made on the Hunterlab Dorigon Model D47R-6 instrument from Hunter Associates Laboratory, Inc of Reston, VA. The Dorigon D47R-6 measures, in percent, the amount of incident light reflected from materials relative to a standard. For nonmetallic surfaces, the standard is the amount of light reflected by a piece of polished black glass with an index of refraction of 1.567. DOI and 2° Haze are each expressed as a percentage of the specular reflectance of the specimen being measured. DOI is the sharpness of the reflected image, as measured by the ratio of the reflectance at 0.3° from specular to the reflectance at the specular angle. DOI is zero for a perfect diffuser and 100 for a perfect mirror. The 2° Haze value is the amount of spreading of specular reflectance as measured by the ratio of specular reflectance at 2° from specular to reflectance at the specular angle. Haze is zero for a perfect mirror and 100 for a perfect diffuser.

The values reported in the above table were taken from hand made lab samples to illustrate the relative effect of casting surface on the finished product. Several different grades of Hostaphan ® PET film from American Hoechst were employed. Film type 4300 does not contain slip additive and is coated on one side to improve adhesion. The lab sample was made by casting the Fluorex onto the uncoated side. Film types 3000 and 2000 contain different slip additives in different amounts. The critical concern is the surface roughness. Type 300 is acceptable, type 2000 is unacceptable, and type 4300 is preferred. In general, PET films with surface roughness of about 0.018 $\mu$m or less are useful for this invention. The actual DOI measurements for commercial production would be higher than the hand prepared lab samples noted above.

Again referring to FIG. 3, after coating the film 23a onto the carrier 24, the carrier is advanced past a spray apparatus and the film 23a is sprayed with a liquid pigmented polymer to form the pigment coating layer 12. An advantage of application by spraying is that the resulting appearance properties simulate that of spray-applied paint to a high degree. While other application methods may be employed, spray application is the preferred method when a metallic pigmented coating is employed. As the solvents and diluents dry from the coating, the pigments become oriented in a generally parallel orientation, similar to the orientation of metallic pigments in a spray-applied metallic automotive paint finish. In the preferred embodiment illustrated, the liquid pigmented polymer is sprayed on the film before the film has solidified. The coated film is then dried, removed from the carrier, and—if desired—provided with a bonding layer in accordance with known procedures. If flakes are present in the pigmented polymer, spraying the pigmented polymer onto the cast film before the cast film has solidified allows the flakes to settle into the cast layer somewhat, and gives a greater depth effect to the film.

The foregoing procedure is preferably used to coat the entire undersurface of the cast film. If desired, a striking visual effect can be achieved by spraying portions of the undersurface of the cast film with a liquid pigmented polymer, after which the other portions of the undersurface of the cast film is sprayed with a liquid pigmented polymer pigmented a different color than the preceding pigmented polymer. This technique can be used to provide decorative sheet materials which have a two-tone colored appearance, and the coatings can overlap so that the colored regions provided by this technique feather into one another. In combination, these two polymer coatings provide an opaque and uninterrupted (in opacity) coating to the undersurface of the substantially clear film.

The decorative sheet material of the present invention can be adhered to a supporting substrate in accordance with known laminating or bonding techniques. Illustrative examples of supporting substrates include metal, wood, and molded polymer substrates. As illustrated in FIG. 4, a shaped article 30 of the present invention comprises a supporting substrate 31 which has a contoured outer surface, and a decorative sheet material 10 adhered to one side of the substrate so as to conform to the contoured surface of the substrate. As explained above, particularly suitable shaped articles of the present invention are exterior automobile body parts such as body panels and bumpers.

The decorative sheet material can be bonded to molded polymer substrates by placing the sheet material into a mold having a contoured, three-dimensional molding surface. A moldable polymer is then introduced into the mold on one side of the sheet material. The sheet material is then molded into a contoured three-dimensional configuration conforming to the molding surface of said mold, while molding said polymer to form a shaped article with the decorative sheet material adhered to the outer surface thereof. Preferably, the decorative sheet material includes a bonding layer, as described above, formed of a polymer different from the pigmented coating, wherein the decorative sheet material is placed into the mold with the bonding layer oriented inwardly away from the molding surface so as to become adhered to the moldable polymer. Suitable polymers for the molded polymer substrate include, for example, polyvinyl chloride, polycarbonate, polystyrene, acrylonitrile-butadiene-styrene, polyethylene, polypropylene, polyethylene terephthalate glycol (PETG), nylon, and RIM urethanes. Polyolefin homopolymers and copolymers (ionomers, etc.) are inexpensive thermoplastic resins which have excellent molding properties and are particularly preferred for practicing the present invention. Polypropylene, for example, when glass filled and foamed with a blowing agent, has performance properties suitable for structural or engineering uses. Acid copolymers of polyethylene, such as Du Pont's "SURLYN" are similar in performance and in addition have exceptional toughness.

Preferably, the tear strength of the preformed film is less than the bond strength of the preformed film to the supporting substrate. This will prevent tears from developing in the preformed film running across the surface of the article, and quickly destroying the article.

In the drawings and specification, typical preferred embodiments of the invention have been disclosed. Although specific terms are employed, they are used in a generic and descriptive sense only and not for purposes of limitation, the scope of the invention being set forth in the following claims.

That which we claim is:

1. A flexible decorative sheet material suitable for use in surfacing panels, such as automobile body panels, said sheet material being characterized by having the appearance of a glossy, base coat/clear coat automotive paint finish, and comprising a flexible outer layer having a smooth, glossy outer surface with a distinctness of image value of 65 percent or greater and formed of a flexible, optically clear weatherable polymer, and a pigmented coating adhered to the opposite surface of said outer layer and visible through the clear outer layer.

2. A decorative sheet material as claimed in claim 1 wherein said flexible outer layer has a distinctness of image value of 75 percent or greater.

3. A decorative sheet material as claimed in claim 1, wherein said outer layer has a 2° haze value of 1 percent or less.

4. A decorative sheet material as claimed in claim 1, further comprising a bonding layer carried by said pigmented coating.

5. A decorative sheet material as claimed in claim 1, wherein said pigmented coating includes reflective flakes oriented generally parallel to said outer layer.

6. A decorative sheet material as claimed in claim 1, wherein said pigmented coating comprises a first pigmented coating on certain portions of the undersurface of the outer layer and visible therethrough, and a second pigmented coating of a different color on certain other portions of the undersurface of the outer layer, which second pigmented coating is also visible therethrough.

7. A decorative sheet material as claimed in claim 1, wherein said pigmented coating is of a thickness less than said outer layer.

8. A decorative sheet material as claimed in claim 1, wherein said outer layer has a thickness of about 0.5 to 300 mils.

9. A decorative sheet material as claimed in claim 1, wherein said weatherable polymer is selected from the group consisting of fluoropolymers, acrylate polymers, urethane polymers, vinyl polymers, and blends thereof.

10. A decorative sheet material as claimed in claim 1, wherein said substantially clear layer comprises a cast, substantially molecularly unoriented film.

11. A flexible decorative sheet material suitable for use in surfacing panels, such as automobile body panels, said sheet material being characterized by having the appearance of a glossy, base coat/clear coat automotive paint finish, and comprising a flexible optically clear outer layer having a smooth outer surface with a distinctness of image value of 65 percent or greater and formed of a cast, substantially molecularly unoriented flexible weatherable polymer selected from the group consisting of fluoropolymers, acrylate polymers, urethane polymers, vinyl polymers, and blends thereof, and a pigmented coating adhered to the opposite surface of said outer layer formed of a flexible polymer with pigments distributed therein.

12. A decorative sheet material as claimed in claim 11, wherein said pigmented coating has reflective flakes uniformly distributed therein in generally parallel alignment to said film to impart to the sheet material the appearance of a base coat/clear coat paint finish.

13. A decorative sheet material as claimed in claim 11, wherein the mean angle of inclination of said flakes to said film is less than about 6.5 degrees.

14. A shaped article having a contoured decorative outer surface, comprising a supporting substrate and a decorative sheet material adhered to one side of said substrate and conforming to said contoured surface, said decorative sheet material being characterized by having the appearance of a glossy, base coat/clear coat automotive paint finish, and comprising a flexible outer layer having a smooth outer surface with a distinctness of image value of 65 percent or greater and formed of a flexible, optically clear weatherable polymer, and a pigmented coating adhered to the opposite surface of said outer layer formed of a flexible polymer with pigments distributed therein.

15. A shaped article as claimed in claim 14, wherein said substantially clear outer layer comprises a substantially molecularly unoriented cast film.

16. A shaped article as claimed in claim 14, wherein said pigmented coating has reflective flakes uniformly distributed therein.

17. A shaped article as claimed in claim 14, wherein said supporting substrate is a rigid metal substrate.

18. A shaped article as claimed in claim 14, wherein said supporting substrate is a molded polymer substrate.

19. A shaped article as claimed in claim 14, further comprising a bonding layer carried by said pigmented coating and adhered to said supporting substrate.

* * * * *